United States Patent [19]
Fuzesi et al.

[11] Patent Number: 4,766,158
[45] Date of Patent: Aug. 23, 1988

[54] URETHANE-CONTAINING OXAZOLIDONE-MODIFIED ISOCYANURATE FOAMS AND A COMPOSITION AND METHOD FOR THEIR PRODUCTION

[75] Inventors: Stephen Fuzesi; Robert W. Brown, both of Hamden, Conn.

[73] Assignee: Olin Corporation, Cheshire, Conn.

[21] Appl. No.: 80,946

[22] Filed: Aug. 3, 1987

[51] Int. Cl.$^4$ ............................................. C08G 18/14
[52] U.S. Cl. .................................... 521/110; 521/118; 521/137; 521/156
[58] Field of Search ................ 521/110, 118, 137, 156

[56] References Cited
U.S. PATENT DOCUMENTS 3,673,128 6/1972 Hayash, Jr. et al. ................. 260/2.5
3,849,349 11/1974 Frisch et al. ................ 260/2.5 AW
4,699,931 10/1987 Fuzesi et al. ......................... 521/117

Primary Examiner—Maurice J. Welsh
Attorney, Agent, or Firm—Dale Lynn Carlson

[57] ABSTRACT

Urethane and oxazolidone-containing isocyanurate foams characterized by cracking resistance and scorching resistance and thermal stability at a temperature of about 160° C. or higher. These foams are produced by reacting at least one polyisocyanate with at least one polyepoxide and at least one polyol in the presence of catalyst, surfactant, and blowing agent.

17 Claims, No Drawings

URETHANE-CONTAINING OXAZOLIDONE-MODIFIED ISOCYANURATE FOAMS AND A COMPOSITION AND METHOD FOR THEIR PRODUCTION

FIELD OF THE INVENTION

This invention relates to a composition and method useful in fabricating crack-resistant, high temperature degradation resistant rigid foams, and is more particularly concerned with a composition and method useful in fabricating thermally stable oxazolidone-modified isocyanurate foams containing a relatively small amount of polyurethane and to the foams so prepared.

BACKGROUND OF THE INVENTION

Urethane-containing oxazolidone-modified isocyanurate foams containing a relatively large amount of polyurethane are known in the art. By way of illustration, U.S. Pat. No. 3,849,349, issued Nov. 19, 1974 to K. C. Frisch et al discloses such foams made by a one-step reaction. In this reaction, a polynuclear polyisocyanate having an isocyanate equivalent weight of between 120 and 160, a polyepoxide, and a polyol are reacted in the presence of a blowing agent and an isocyanate trimerization catalyst. The polyol is present in the foam formulation in an amount of between 15 and 40 percent based on the total weight of these three reactants. The foam made in accordance with this patent contains a significant amount of thermally unstable urethane linkages produced by the reaction of the polyol and the polyisocyanate, thereby making this foam subject to a relatively large amount of thermal degradation at elevated temperatures.

Urethane-free oxazolidone-modified isocyanurate foams characterized by high temperature degradation resistance are disclosed in a co-pending application, U.S. Ser. No. 855,992, of S. Fuzesi et al assigned to Olin Corporation. These urethane-free foams, although exhibiting excellent thermal degradation resistance, sometimes exhibit cracking during high temperature processing, particularly mold-fabricated foams.

Hayash et al, U.S. Pat. No. 3,673,138 discloses polyoxazolidone foams produced by reacting a polyepoxide with a polyisocyanate in a proportion of from about 0.70 equivalent to about 1.25 equivalents of polyepoxide per equivalent of polyisocyanate. However, the use of the such high relative amounts of polyepoxide is costly since commercial polyepoxides are about twice as expensive as polyisocyanates. Moreover, the use of these ratios of polyepoxide to polyisocyanate have been found to produce such a strong exothermic reaction as to cause scorching and associated thermal degradation of interior portions of the foam during fabrication thereof.

In view of the above, it would be highly desirable to provide improved foams characterized by excellent thermal degradation resistance, as well as scorch and crack resistance during high temperature aging of the foams.

SUMMARY OF THE INVENTION

In one aspect, the present invention relates to a composition useful for fabricating a high temperature degradation-resistant, cracking-resistant, rigid urethane-containing oxazolidone-modified isocyanurate foam comprising:

(a) at least one polyisocyanate having an isocyanate equivalent weight of between about 80 and about 160,
(b) at least one polyepoxide present in an amount of between about 0.1 and about 0.6 equivalents of polyepoxide per equivalent of said polyisocyanate,
(c) at least one polyol in an amount of between about 1 and about 10 weight percent based upon the total weight of said polyisocyanate plus said polyepoxide plus said polyol in said composition,
(d) at least one catalyst to promote isocyanate trimerization and reaction of said polyepoxide and said polyol with said polyisocyanate, and
(e) at least one blowing agent.

In another aspect, the present invention relates to a "one-shot" or "one-step" method of producing a high temperature degradation resistant, cracking-resistant, rigid urethane-containing oxazolidone-modified isocyanurate foam by reacting a composition comprising at least one polyisocyanate having an isocyanate equivalent weight of between about 80 and about 160 with at least one polyepoxide, in an amount of between about 0.1 and about 0.6 equivalents of polyepoxide per equivalent of said polyisocyanate, and at least one polyol, in an amount of between about 1 and about 10 weight percent based upon the total weight of said polyisocyanate plus said polyepoxide plus said polyol in said composition, in the presence of at least one catalyst to promote isocyanate trimerization and reaction of said polyepoxide with said polyisocyanate, and at least one blowing agent. In this method, the polyisocyanate (the "A-side" stream) and polyepoxide (the "B-side" stream) and polyol with the catalyst (the "C-side" stream) are reacted in the presence of a blowing agent, and preferably also a surfactant to assist in cell formation.

In yet another aspect, the present invention relates to the foam produced by the above method.

DETAILED DESCRIPTION OF THE INVENTION

It has now been found in accordance with the present invention that urethane-containing oxazolidone-modified isocyanate foams having outstanding resistance to thermal degradation at temperatures of 160° C. or higher, as well as outstanding resistance to cracking during heat aging thereof, can be prepared in a one-shot procedure by the reaction of polyisocyanates with polyols and polyepoxides in specified proportions, whereby less than a stoichiometric amount of polyepoxide and a relatively small amount of polyol is used. These foams not only resist cracking thermal degradation, but also, due to the small proportion of polyepoxide and polyol used, do not tend to scorch during production of the foam and are relatively inexpensive to fabricate using the "one-shot" production method. Also, without wishing to be bound by any particular theory, it is theorized that the presence of limited amounts of urethane linkages in the foams of the present invention provides some "give" in the foam via localized urethane linkage softening during heat aging of the foam, thereby avoiding cracking in the foam as a whole. Prior to the present invention, this cracking problem was particularly apparent in molded foams.

The preparation of the foam forming composition of the invention is readily accomplished by bringing together the polyisocyanate, the polyepoxide, the polyol, the catalyst, the blowing agent and any other adjuvants (as discussed hereinafter) using agitation means sufficient to ensure homogeneity in the resultant mixture. The mixing of the components can be carried out by hand, when operating on a small scale, but is advantageously carried out using the various mixing and dispensing machines conventionally employed in the manufacture of polymer foams; see, for example, Ferrigno "Rigid Plastic Foams," Reinhold Publishing Corporation, New York, 1963.

Immediately after completion of mixing of the components, the foam reaction mix is poured or dispensed directly into the appropriate mold and foaming is allowed to take place in the mold in accordance with procedures well recognized in the art for the molding of polymer foams.

Polymer foam formation takes place spontaneously after mixing of the various reactants set forth above, and it is unnecessary to employ any excessive heat in order to initiate the foam producing reaction. Indeed, the foam producing reaction is exothermic, more so than is the case with most polymer foam forming systems, such as polyurethane foam forming systems encountered in the art. Accordingly, allowance is made for this exothermicity in designing the molds employed with the polymer foams of the invention.

In a preferred embodiment of the "one-shot" method of the present invention, the isocyanatecontaining stream (commonly referred to as the "A-side") and the polyepoxide-containing stream (commonly referred to as the "B-side") are mixed and to the resulting mixture is added a catalyst-containing stream referred to as the "C-side"). The polyol can be added to the "B-side" or to the "C-side". If the polyol is self-catalytic (e.g., amine-containing), it is preferred to add the polyol to the "C-side". Each of these streams are preferably liquids in which all of the various additives are preferably soluble, although dispersions utilizing solid components can be employed if desired. In addition, each of the streams are preferably shelf-stable at ambient temperature (e.g. from about 10° C. to about 40° C.) for a time period of at least three months. In accordance with a preferred embodiment of the present invention, the B-side contains polyepoxide, blowing agent, and a surfactant to assist in foam cell formation. These three ingredients are appropriately selected to provide a combination of "B-side" stability and additive solubility, as discussed above.

A typical "B-side" formulation is prepared by blending:

| | |
|---|---|
| DER-331 (a polyepoxide product of Dow Chemical Company) | 15 g |
| DC-193 (a silicone surfactant product of Dow Corning Corporation) | 2 g |
| R-11 B (a fluorocarbon blowing agent product of E. I. du Pont de Nemours and Company, Inc.) | 11 g |

A typical "C-side" formulation is prepared by blending 5 g of DMP-30 (an amine catalyst product of Rohm & Haas) and 5 g of a polyol.

After thorough mixing of the "A", "B", and "C" sides at room temperature, these blends individually form clear solutions having a viscosity of about 300 cps at room temperature. This clear solution are "shelf" stable during more than 20 weeks of storage at room temperature with no change in viscosity or phase separation occurring during this time period.

As set forth above, the polyepoxide, as hereinafter defined and exemplified, is employed in a proportion corresponding to about 0.1 equivalent to about 0.6 equivalents per equivalent of polyisocyanate. Preferably, the polyepoxide is employed in a proportion corresponding to about 0.2 equivalent to about 0.6 equivalent per equivalent of polyisocyanate. Below the lower limit of about 0.1 equivalent of polyepoxide per equivalent of polyisocyanate the resulting foam is expected to be excessively friable. Above the upper limit of about 0.6 equivalents of polyepoxide per equivalent of polyisocyanate, the resulting foam is expected to undergo excessive interior scorching and associated foam cell structure degradation during fabrication due to the increased exotherm of reaction by the additional polyepoxide. By "equivalents" of polyepoxide is meant the molecular weight of the latter divided by the number of epoxy groups present in the molecule. The equivalent weight is expressed in whatever units, i.e., grams, pounds, tons, etc., are used to designate the amounts of the other components of the reaction mixture. Similarly, the term "equivalent" used in relation to the polyisocyanate has its usually accepted meaning, namely, the molecular weight of the polyisocyanate, in whatever units are used to designate the amounts of the various components of the reaction mixture, divided by the number of isocyanate groups present in the molecule.

The polyisocyanate employed in the preparation of the cellular polymers of the invention can be any of the polyisocyanates, organic and inorganic, known to be useful in the art of polymer formation. Such polyisocyanates are commonly employed in the preparation of polyurethanes by reaction with compounds containing two or more active hydrogencontaining groups (i.e., groups which show a positive reaction .When tested by the Zerewitinoff method, J. Am. Chem. Soc., 49, 3181, 1927).

Illustrative of such polyisocyanates are 2,4-tolylene diisocyanate, 2,6-tolylene diisocyanate, 4,4'-methylenebis(phenyl isocyanate), dianisidine diisocyanate, tolidine diisocyanate, hexamethylene diisocyanate, m-xylene diisocyanate 1,5-napthalene diisocyanate, p-phenylene diisocyanate, 1,4-diethylbenzene-$\beta,\beta'$-diisocyanate and other di- and higher polyisocyanates such as those listed in the tables of Siefken, Ann. 562, 122–135 (1949). Mixtures of two or more of the above isocyanates can be used, such as mixtures of the 2,4- and 2,6-isomers of tolylene diisocyanate, mixtures of the 2,4'- and 4,4'-isomers of methylenebis(phenyl isocyanate) and the like. In addition to the 4,4'-methylenebis(phenyl isocyanate) or mixtures of the 2,4'-isomer and 4,4'-isomer thereof which are employed as the isocyanate component, there can also be used modified forms of these isocyanates. For example, there can be used 4,4'-methylenebis(phenyl isocyanate), or an admixture thereof with a minor amount of the 2,4'-isomer, which has been treated to convert a minor proportion, generally less than 15 percent by weight of the starting material, to an artifact of said starting material. For example, the polyisocyanate component can be methylenebis(phenyl isocyanate) which has been converted to a stable liquid at temperatures of about 15° C. and higher using, for example, the processes described in Belgian Patent No. 678,773.

Illustrative of another modified form of 4,4'-methylenebis(phenyl isocyanate) which can form the polyisocyanate component is the product obtained by treating the former compound, or mixtures thereof with small portions of 2,4'-isomer, with a minor portion of a carbodiimide such as diphenylcarbodiimide in accordance, for example, with the procedure described in British Patent No. 918,454. In accordance with said process, a minor proportion of the methylenebis(phenyl isocyanate) is converted to the corresponding isocyanato-carbodiimide and there is obtained a mixture of a major proportion of unchanged starting material and a minor proportion of said isocyanato-substituted carbodiimide.

In addition to the various modified forms of methylenebis(phenyl isocyanate) exemplified above there can also be employed as the polyisocyanate component a mixture of methylene-bis(phenyl isocyanate) with polymethylene polyphenyl isocyanates of higher functionality. Such mixtures are generally those obtained by phosgenation or corresponding mixtures of methylene bridged polyphenyl polyamines. The latter, in turn, are obtained by interaction of formaldehyde, hydrochloric acid and primary aromatic amines, for example, aniline, o-chloroaniline, o-toluidine and the like. Such polyamines, and polyisocyanates prepared therefrom, are known in the art, see, for example, U.S. Pat. Nos. 2,683,730; 2,950,263; 3,012,008 and 3,097,191; Canadian Pat. No. 665,495; and German Pat. No. 1,131,877. The preferred polyisocyanates are methylenebis(phenyl isocyanates) and the modified forms thereof including mixtures of polymethylene polyphenyl isocyanates containing from about 35 percent by weight to about 85 percent by weight of methylenebis(phenyl isocyanate). The most preferred polyisocyanate is a polymethylene polyphenyl isocyanate mixture containing from about 35 percent by weight to about 60 percent by weight of methylenebis(phenyl isocyanate), the remainder of said mixture being polymethylene polyphenyl isocyanates having a functionality greater than 2.0.

The term "polyol" as used herein and in the claims is taken to mean a polyhydroxy organic compound having alcoholic and/or phenolic hydroxy groups and includes also polyether polyols and polyester polyols.

An adequate polyol has a hydroxy equivalent weight of 30 to 2,000, preferably 100 to 400.

Typical aliphatic or cycloaliphatic polyhydroxy alcohols or polyhydric phenols which can be employed in the present formulations are ethylene glycol, diethylene glycol, glycerol, hexylene glycol, trimethylol propane, pentaerythritol, sorbitol, triethanolamine, inositol, resorcinol, pyrogallol, hydroquinone, cyclohexanediol, 1,5-naphthalene diol, trimethylol ethane, and the like.

The polyether polyols that are suitable include diol-, triol-, tetrol-, pentol-, hexol-, and octol-types as well as phosphorus-containing polyether polyols and phosphorus- and halogen-containing polyether polyols and amine based polyether polyol.

The polyester polyols that are suitable include the neutral polyester type, phosphorus-containing polyester, polyols, halogen-containing polyester polyols, and phosphorus- and halogen-containing polyester polyols.

Aromatic based neutral polyols and aromatic amine-based polyols are preferable polyether polyols for use as the polyol component in the present invention.

Some of these polyols include polyether polyols derived from alkylene oxide and a polymethylene polyphenylamine which is a reaction product of formaldehyde with at least one amine selected from the group consisting of aniline, o-, m-, p-toluidine, o-, m-, p-diamino benzene, 2,4-tolylene diamine 4,4'- or 2,4-diaminodiphenylmethane.

Preferably, the polyol is employed in an amount of between about 1 and about 10 (more preferably between about 5 and about 10) weight percent based on the total weight of polyisocyanate plus epoxide plus polyol used in the foam forming composition. Below the lower limit of about 1 weight percent polyol, the resulting foam is expected to provide unacceptable cracking after high temperature aging. Above the upper limit of about 10 weight percent polyol, the resulting foam is expected to have excessively poor dimensional stability (i.e., expansion and/or contraction of the foam) upon high temperature aging thereof.

The polyepoxides employed in the composition of the invention can be any compound containing two or more epoxide

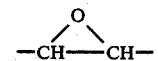

or oxirane groups. The preferred polyepoxides used in preparing the cellular polymers of the invention are homocyclic polyepoxides.

Such epoxides are characterized by the presence of at least two epoxy groups each of which is present in a substituent attached to a cyclic hydrocarbon compound or is fused to a nonaromatic ring in a cyclic hydrocarbon compound. Examples of homocyclic polyepoxides are:

1. the glycidyl ethers of polyhydric mononuclear and fused ring phenols such as resorcinol, hydroquinone, pyrocatechol, saligenin, phloroglucinol, 1,5-dihydroxynaphthalene, 1,6-dihydroxynaphthalene, 1,7-dihydroxynaphthalene and the like;

2. the glycidyl ethers of non-fused polynuclear phenols represented by the general formula:

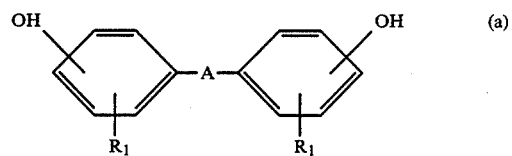

where $R_1$ represents from 0 to 4 from the class consisting of halogen and lower-alkyl, A is a bridging group selected from the class consisting of

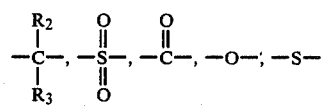

and a single covalent bond, wherein $R_2$ and $R_3$ each represent a moiety selected from the class consisting of hydrogen, lower-alkyl, lower-cyclo-alkyl and aryl. Illustrative of such compounds are the bis(glycidyl ethers) of:
4,4'-dihydroxydiphenylsulfone,
4,4'-dihydroxybiphenyl,
4,4'-dihydroxybenzophenone,
di(4-hydroxyphenyl)methane(bisphenol F),
2,2-di(4hydroxyphenyl)butane(bisphenol B),
2,2-di(4-hydroxyphenyl)propane(bisphenol A),
1,1-di(4-hydroxyphenyl)propane,
3,3-di(3-hydroxyphenyl)pentane,
2-(3-hydroxyphenyl)-2-(4-hydroxyphenyl)butane, 1-phenyl-1-(2-hydroxyphenyl)-1-(3-hydroxyphenyl)-propane
1-phenyl-1,1-di(4-hydroxyphenol)butane
1-phenyl-1,1-di(4-hydroxyphenyl)pentane,
1-tolyl-1,1-di(4-hydroxyphenyl)ethane,
bis(3-bromo-4-hydroxyphenyl)methane
2,2-bis(3-bromo-4-hydroxyphenyl)propane,
bis(3-bromo-4-hydroxyphenyl)diphenylmethane,
1,1-bis(3-bromo-4-hydroxyphenyl)-1-(2,4-dibromo-phenyl)ethane,
2,2-bis(3-bromo-4-hydroxyphenyl)propionitrile,
bis(3,5-dibromo-4-hydroxyphenyl)diphenylmethane,
1,1-bis(3,5-dibromo-4-hydroxyphenyl)-1-(2,5-dibromo-phenyl)ethane,
bis(3-bromo-4-hydroxyphenyl)sulfone,
bis(3,5-dibromo-4-hydroxyphenyl)sulfone;

3. the glycidyl ethers of novolac resins. The novolac resins are the products obtained by acid condensation of phenol, or a substituted phenol, with formaldehyde and are conventionally represented by the general formula:

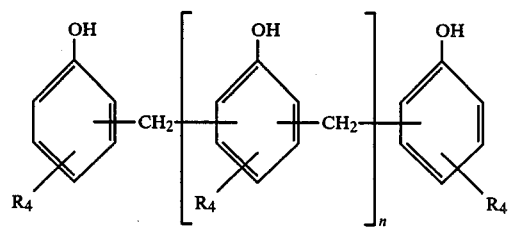
(b)

wherein n has an average value of from about 2 to 12 and $R_4$ represents from 0 to 4 substituents selected from halogen and lower alkyl groups. It is to be understood that the above formula is highly idealized and is an approximation only; see, for example, Carswell, *Phenoplasts*, pages 29-35, Interscience, New York, 1947. A wide range of novolac resins of differing molecular weights is available commercially, all of which are represented approximately by the above formula. Since the class of novolac resins is so well recognized in the art, the epoxides derived therefrom by conversion of the novolacs to their glycidyl ethers (by conventional procedures, e.g., reaction with epichlorohydrin) will be referred to hereafter as "Novolac resin glycidyl ethers;"

4. dicyclopentadiene dioxide, i.e., the compound having the formula:

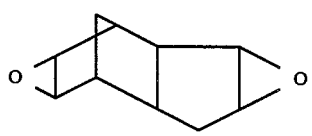
(c)

5. The vinyl cyclohexene dioxide, i.e., the compound having the formula:

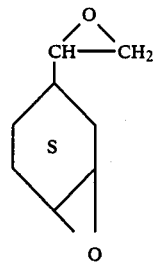
(d)

6. the dicyclohexyl oxide carboxylates represented by the general formula:

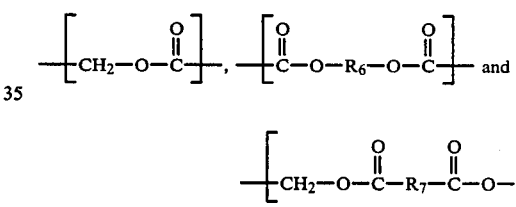
(e)

wherein $R_5$ in each instance represents from 0 to 9 lower-alkyl groups, and B represents a bivalent radical selected from the class consisting of:

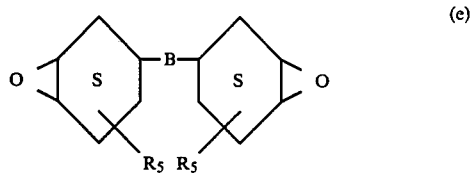 and

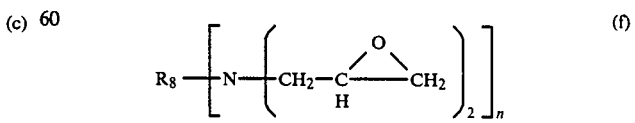

wherein $R_6$ is selected from the class consisting of lower alkylene and lower-oxyalkylene and $R_7$ is selected from the class consisting of lower-alkylene and arylene. Examples of the dicyclohexyl oxide carboxylates are:
3,4-epoxycyclohexylmethyl 3,4-epoxycyclohexanecarboxylate,
3,4-epoxy-6-methylcyclohexylmethyl, 3,4-epoxy-6-methylcyclohexylcarboxylate.
bis(3,4-epoxycyclohexylmethyl)maleate,
bis(3,4-epoxycyclohexylmethyl)succinate,
ethylene glycol bis(3,4-epoxycyclohexanecarboxylate),
2-ethyl-1,3-hexanediol bis(3,4-epoxy-6-methylcyclohexanecarboxylate) and the like.

7. the glycidyl derivatives of aromatic amines represented by the formula:

(f)

wherein n is an integer of from 1 to 3 and $R_8$ is an aromatic residue of valency n selected from the class consisting of aromatic residues having the formulae:

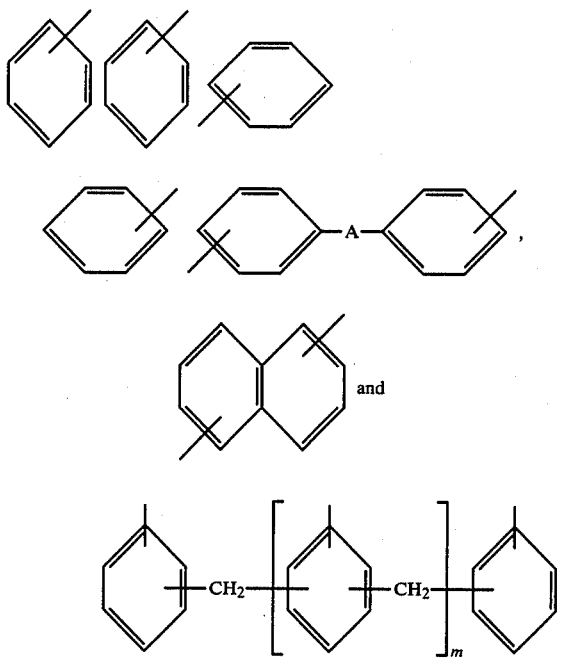

wherein A is a bridging group as hereinbefore defined and m is a number having an average value of from about 1.0. Illustrative of such compounds are the N,N-diglycidyl derivatives of:
aniline,
2,4-tolylene diamine,
2,6-tolylene diamine,
m-phenylene diamine,
p-phenylene diamine,
4,4'-diamino-diphenyl,
4,4'-diamino-diphenyl methane,
2,2-di(4-aminophenyl)propane,
2,2-di(4-aminophenyl)butane,
4,4'-diamino-diphenyl sulfide,
4,4'-diamino-diphenyl sulfone,
4,4'-diamino-diphenyl ether,
1,5-diamino-napthalene, and
methylene-bridged polyphenyl polyamines from about 35 percent by weight to about 85 percent by weight of methylenedianilines, the remaining parts of said mixture being triamines and polyamines of higher molecular weight, said polyamine mixture having been formed by acid condensation of aniline and formaldehyde. The latter polyamine mixtures can be prepared by procedures well-known in the art; see, for example, British Patent Specification No. 1,042,220.

The term "lower-alkyl" is used throughout this specification and claims as meaning alkyl containing from 1 to 6 carbon atom such as methyl, ethyl, propyl, butyl, pentyl, hexyl, and isomeric forms thereof. The term "halogen" means fluorine, chlorine, bromine, and iodine. The term "lower-alkylene" means alkylene containing from 1 to 6 carbon atoms such as methylene, ethylene, 1,3-propylene, 1,4-butylene, 2,3-butylene, 1,6-hexylene and the like. The term "lower-cycloalkyl" means cycloalkyl from 4 to 8 carbon atom such as cyclobutyl, cyclopentyl, cyclohexyl, cycloheptyl and cyclootyl. The term "lower-oxyalkylene" means lower-alkylene, as defined above, interrupted by the radical —O—. The term "arylene" means a bivalent radical, such as phenylene, tolylene, xylylene, biphenylene and the like, derived from an aromatic hydrocarbon by removal of a hydrogen atom from each of two carbon atoms of the nucleus. The term "aryl" means the moiety obtained by removing one hydrogen atom from an aromatic hydrocarbon of from 6 to 12 carbon atoms, inclusive. Illustrative of aryl moietites are phenyl, tolyl, xylyl, biphenylyl, naphthyl and the like.

The homocyclic polyepoxides described and exemplified hereinabove are, for the most part, well-known in the art and can be prepared by methods well-known in the art; see, for example, Lee and Neville, *Epoxy Resins*, McGraw-Hill Book Company, New York (1957), U.S. Pat. Nos. 2,633,458; 2,716,123; 2,745,847; 2,745,285; 2,872,427; 2,884,408; 2,902,518; 2,921,027; 3,312,664; 3,268,619; 3,325,452 and British Patent No. 614,235.

While any of the homocyclic polyepoxide compounds exemplified hereinabove can be used in the preparation of the high temperature resistant polymers of the invention, the preferred compounds for this purpose are those of the groups (2), (3), and (7) set forth above, namely, the glycidyl ethers of non-fused polynuclear phenols represented by the formula (a) above, the novolac resin glycidyl ethers represented by formula (b) above, and the glycidyl derivatives of primary aromatic amines represented by the formula (f) above. The use of epoxides of these classes gives rise to cellular polymers of the invention which possess the highest resistance to deformation by heat and the lowest flame spread rating of the cellular polymers of this class.

Within this particular group of polyepoxies we have found that those which are derived from phenols of the formula (b) above are the most preferred since they give rise to cellular polymers having the highest resistance to flame spread and heat deformation.

The amount of catalyst employed in the compositions of the present invention is a "catalytically effective" amount, i.e., an amount sufficient to catalyze the reaction of polyisocyanate and polyepoxide to form polyoxazolidone, and the reaction of polyol and polyisocyanate to form urethane, as well as to effect trimerization of the molar excess of polyisocyanate (vis-a-vis the polyepoxide) to produce isocyanurate linkages. Advantageously, the catalyst is employed in an amount corresponding to between about 1.0 and about 10 weight percent based on the weight of the total composition. Preferably, the catalyst is a tertiary amine employed in a more preferred amount corresponding to between about 3 and about 7 weight percent based on the weight of the total composition, although tin catalysts such as dibutyltin dilaurate, or mixtures of amine and tin catalysts are also suitably employed.

Useful tertiary amines are those which are generally employed to catalyze the reaction between an isocyanato group and an epoxide group. Such catalysts are a group of compounds well-recognized in the art of synthesizing polyurethanes; see, for example, Saunders et al, *Polyurethanes, Chemistry and Technology*, Part I, pages 228–230, Interscience Publishers, New York, 1964, see also Burkus, J., *Journal of Organic Chemistry*, 26, pages 779–782, 1961.

Representative of said tertiary amine catalysts are: N,N-dialkylpiperazines such as N,N-dimethylpiperazine, N,N-diethylpiperazine and the like; trialkylamines such as trimethylamine, triethylamine, tributylamine and the like; 1,4-diazabicyclo(2-2-2)octane, which is more frequently referred to as triethylene diamine, and the lower-alkyl derivatives thereof such as 2-methyl triethylene diamine, 2,3-dimethyl triethylene diamine, 2,5-diethyl triethylene diamine and 2,6-diisopropyl triethylene diamine; N,N',N''-trialkylaminoalkylhexahydrotriazines such as N,N'N''-tris(dimethylaminomethyl)-hexahydrotriazine, N,N',N''-tris(dimethylaminoethyl)hexahydrotriazine, N,N',N''-tris(dimethylaminopropyl)hexahydrotriazine, N,N',N''-tris(diethylaminoethyl)hexahydrotriazine, N,N', N''-tris(diethylaminopropyl )hexahydrotriazine and the like; mono-, di-, and tri-(dialkylaminoalkyl) monohydric phenols or thiophenols such as 2-(dimethylaminomethyl)phenol, 2-(dimethylaminobutyl)phenol, 2-(diethylaminoethyl)-phenol, 2-(diethylaminobutyl)phenol, 2-(dimethylaminomethyl)thiophenol, 2-(diethylaminoethyl)thiophenol, 2,4-bis(dimethylaminoethyl)phenol, 2,4-bis(dipropylaminobutyl)phenol, 2,4-bis-(dipropylaminoethyl)phenol, 2,4-bis(dimethylaminoethyl)thiophenol, 2,4-bis(diethylaminopropyl)thiophenol, 2,4-bis(dipropylaminoethyl)-thio-phenol, 2,4,6-tris(dimethylaminoethyl)phenol, 2,4,6-tris(diethylaminoethyl)-phenol, 2,4,6-tris(dimethylaminobutyl phenol, 2,4,6-tris-(dipropylaminomethyl)phenol, 2,4,6-tris(diethylaminoethyl)thiophenol, 2,4,6-tris(dimethylaminoethyl)thiophenol and the like; N,N,N',N'-tetraalkylalkylenediamines such as N,N,N',N'-tetramethyl-1,3-propane diamine, N,N,N',N'-tetramethyl-1,3-butanediamine, N,N,N',N'-tetramethylethylenediamine and the like; N,N-dialkylcyclohexylamines such as N,N-dimethylcyclohexylamine, N,N-diethylcyclohylamine and the like; N-alkyl morpholines such as N-methylmorpholine, N-ethyl-morpholine and the like; N,N-dialkylalkanolamines such as N,N-dimethylethanolamine, N,N-diethylethanolamine and the like; N,N,N',N'-tetra-alkylguanidines such as N,N,N',N'-tetramethylguanidine, N,N,N',N'-tetraethylguanidine and the like.

The preferred tertiary amine catalyst is 2,4,6-tris(-dialkylaminoalkyl)phenol (commercially available as "DMP-30" a product of Rohm & Haas Company).

If desired, any organometallic compound known to be an isocyanate trimerization catalyst as well as the catalyst in the reaction between an isocyanato group and an active hydrogen-containing group can be employed in the compositions of the present invention; see, for example, Saunders, ibid, Part I, pages 228 to 232, and Britain et al, *Journal Applied Polymer Science* 4, pages 207 to 211, 1960. Such catalysts include the organic acid salts of, and the organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium. The preferred group of said organometallic derivatives is that derived from tin examples of this preferred group are: dibutyltin diacetate, dibutyltin dilaurate, stannous octoate, stannous oleate, and the like.

The blowing agent which is employed in the compositions of the invention can be water (which generates carbon dioxide by reaction with isocyanate) or a volatile organic solvent such as the lower molecular weight halogenated aliphatic hydrocarbons, namely, those of boiling points from about −40° to about 200° C., preferably from about −10° C. to about 110° C. Illustrative of such halogenated aliphatic hydrocarbons are difluoromonochloromethane, trichloromonofluoromethane, dichlorodifluoromethane, chlorotrifluoromethane, 1,1,2-trichloro-1,2,2trifluoroethane, 1,1-dichloro-1-fluoroethane, 1-chloro-1,1-difluoro-2,2-dichloroethane, 1,1,1-tribromo-2-chloro-2-fluorobutane, methylene chloride and the like.

Generally speaking, the amount of blowing agent employed depends upon the desired density. Thus, if low density foams, i.e., 2 to 10 pounds per cubic foot, are desired, the amount of halogenated aliphatic hydrocarbon is from about 5 to about 20 percent by weight based on the total weight of the composition. When water is employed as the blowing agent, the amount required to produce foams of density within the above range is from about 2.0 parts to about 3.0 parts by weight based on the total formulation weight. If desired, a mixture of water and one or more of said halogenated aliphatic hydrocarbons can be employed as blowing agent.

Other optional additives such as dispersing agents, cell stabilizers, surfactants, flame retardants, and the like, which are commonly employed in the fabrication of polymer foams, can be employed in the process of the invention. A finer cell structure may be obtained if water-soluble organosilicone polymers are used as surfactants in the reaction mix. If used, the surfactant is preferably employed in an amount of between about 1.0 and about 5.0 weight percent based on the weight of the composition. Organosilicone polymers obtained by condensing a polyalkoxypolysilane with the monoether of a polyalkylene glycol in the presence of an acid catalyst are representative of those surfactants which can be used for this purpose. Other surfactants such as ethylene oxide modified sorbitan monopalmitate or ethylene oxide modified polypropylene ether glycol may be used, if desired, to obtain better dispersion of the components of the foam mixture.

Other optional additives, such as inorganic and organic fillers, can be employed in the process of this invention. Illustrative inorganic fillers are calcium carbonate, calcium phosphate, silica, glass, wood flakes, antimony oxides, etc. Illustrative organic fillers are the various polymers, copolymers of vinyl chloride, vinyl acetate, acrylonitrile, styrene, melamine, partially oxyalkylated melamine, etc. Melamine and partially oxyalkylated melamine are preferred. Organic esters can also be employed if desired. Particularly preferred esters are those derived from dicarboxylic acids such as oxalic, malonic, succinic, glutaric, maleic, phthalic, isophthalic and terephthalic acids. The use of an organic filler, particularly isophthalic and/or terephthalic esters, is preferred in the composition of the present invention since these organic fillers are liquid and soluble in the "B-side".

The flame retardants which are optionally, employed in the compositions of the invention are those flame retardants known in the art which do not contain active hydrogen groups, as hereinbefore defined, i.e., those flame retardants which do not react with the polyisocyanate. Illustrative of such flame retardants are: tris(-haloalkyl)phosphates such as tris-(2chloroethyl(phosphate, tris(2-bromoethyl(phosphate, tris)2,3-dichloroethyl)phosphate, tris(2,3dibromoethyl)phosphate, monoammonium phosphate, ammonium polyphosphates, sodium borate, di(2-haloalkyl)2-haloalkanephosphonates such as di(2-chloro-ethyl) 2-chloroethane phosphonate, di 2-chloropropyl 2-chloropropane phosphonate, di(2-bromopropyl) 2-bromopropane phosphonate, antimony oxides, polyvinyl chloride resins, dialkyl alkanephosphonates such as dimethyl methylphosphonate, dialkyl allylphosphonate, dimethyl benzylphosphonate, diamyl amylphosphonate, trimethylphosphorothionate, ethylene phenyl phorphorothionate, tetraholobisphenols such as tetrachlorobisphenol A, tetrabromobisphenol A, and the like; said flame retardants are employed in the compositions of the invention in the appropriate amounts necessary to impart the desired degree of flame retardancy to the resulting cellular polymer.

In general the amount of flame retardant employed is within the range of about 5 to about 30 percent by weight based on polyepoxide although higher amounts, up to about 60 percent by weight based on polyepoxide, can be employed in the case of those flame retardants which are solid at ambient temperatures.

Without wishing to be bound to any particular theory and in order to aid in an understanding of the invention, we deem it pertinent to point out that the principal reaction, which is believed to take place in the formation of the polymers of this invention, is that which leads to the formation of polyoxazolidinone and isocyanurate.

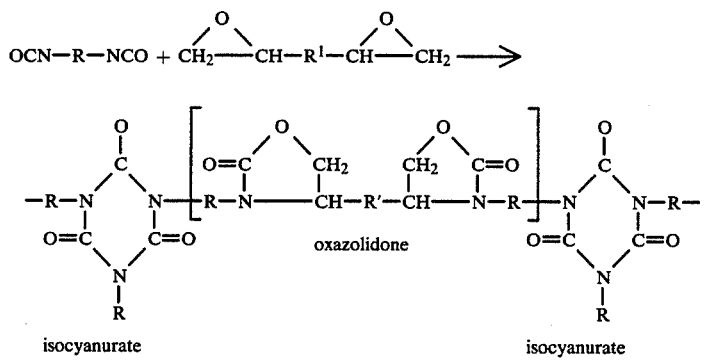

The rigid cellular foams made in accordance with the present invention generally have a density of between about 1.5 and about 20 pcf (preferably between about 2 and about 5 pcf . These foams possess markedly superior high temperature properties as compared with the urethane and urethane-modified isocyanurate cellular polymers that are presently available commercially. On this basis, the cellular products of the invention can be employed for all the purposes for which the currently produced cellular products are conventionally employed and are particularly suitable for applications where higher thermal resistance is required (e.g., thermal resistance at a temperature of at least 140° C. for at least one year or more). For example, the cellular products of the invention can be employed as insulating materials for high temperature pipe lines, tanks, stills, high and low pressure steam lines, etc.

The following examples describe the manner and process of making and using the invention and set forth the best mode contemplated by the inventors of carrying out the invention but are not to be construed as limiting. All parts are by weight unless otherwise stated.

EXAMPLE 1

Preparation of Oxazolidone-Containing Isocyanurate Foams Containing Small Amounts of Polyurethane and Comparison with Polyurethane-Free and High Polyurethane-Containing Oxazolidone-Modified Isocyanurate Foams This example provides a comparison of physical properties of several oxazolidone-containing isocyanurate foams containing limited amounts of polyurethane, as compared to a urethane-free and a high urethane oxazolidone-containing isocyanurate foam.

The foams of the present invention were prepared by the following illustrative procedure:

A polyepoxide (DER-331, a product of Dow Chemical Company having an epoxide equivalent weight of between about 182 and about 190), in an amount of 43.5 grams was blended with 5.8 grams of a surfactant (Dow Corning Corporation's DC-193, a silicon polymer), together with 31.9 grams of trichlorofluoromethane blowing agent (R-11B, a product of E. I. du Pont de Nemours & Co., Inc.), and 165.3 grams of a polymeric isocyanate (PAPI-135, a product of Dow Chemical Company). Into this blend was incorporated a blended mixture of 29 grams of POLY-G ® 30-168 polyol and 14.5 grams of DMP-30 catalyst (POLY-G ® 30-168 is a product of Olin Corporation and DMP-30 is 2,4,6-tri(dimethylaminomethyl)phenol, a product of Rohm and Haas). After thorough mixing, the resulting reaction mixture was poured into a preheated 12"×12"×2" mold. The mold then was closed allowing the reaction mixture to fill up the mold cavity with the foam formed. The mold was then placed into a preheated oven at 130° F. for 15 minutes.

The high urethane comparison foams was prepared by an analogous procedure but using a higher level of polyol.

The urethane-free comparison foam was produced as follows:

A polyepoxide, (DER-331, a product of Dow Chemical Comapny having an epoxide equivalent weight of about 182) in an amount of 43.5 grams was blended with 5.8 grams of a surfactant (Dow Corning Corporation's DC-193, a silicon polymer) together with 31.9 grams of trichlorofluoromethane blowing agent (R-11B, a product of E. I. du Pont de Nemours and Company, Inc.), and 14.5 grams of catalyst (DMP-30, 2,4,6-tri(dimethylaminomethylphenol), a product of Rohm and Haas Company). Into this blend was incorporated 194.3 grams of a polymeric isocyanurate (PAPI-135, a product of Dow Chemical). After thorough mixing, the resulting reaction mixture was poured into a 130° F. preheated 12"×12"×2" mold.

The mold was filled with the foam and then placed into the preheated (130° F.) oven for 15 min. After 15 min., the mold was dissassembled and the cured rigid foam was removed from it. The specific foam formulations used are identified in TABLE I below. The samples of the foams measuring 5"×5"×2" were heat aged by oven exposure under either "preheating" or "slowheating" conditions as described below.

The conditions for "preheating" of the foams are as follows:

The oven was heated to 190° C. for one set of tests and 210° for another set of tests. The samples were placed into the heated oven for one hour. The oven was shut off and opened, leaving the door open. The foam was taken from the oven at room temperature. The expansion of the foam was measured and % ΔV was calculated.

The oven was again heated as above. The samples which had been heated for one hour were again placed into the preheated oven. After one hour, the oven was opened for 5 to 10 minutes. Once that time had expired, the door was closed and the samples were again heated. This procedure was repeated twice for a total of three cycles. After the last cycle, the sample was left in the oven for 24 hours. As above, the foam was taken at room temperature, expansion of the foam measured, and % ΔV calculated.

The conditions for "slowheating" of the foam were the same as for the preheating as set forth above except that the samples were placed into the oven at room temperature and the oven was slowly heated to the necessary temperature (e.g., 190° C. or 210° C.) during a 35 minute period.

The various oven temperature conditions and the results for each condition are found in TABLE I below.

TABLE I

LIMITED URETHANE-CONTAINING OXAZOLIDONE MODIFIED ISOCYANURATE FOAMS AND COMPARATIVE URETHANE-FREE AND HIGH URETHANE-CONTAINING MOLDED FOAMS
Formulation and Processing Data and Physical Properties

|  | Comparison Foam A | Comparison Foam B | Comparison Foam C | Foam 1 | Foam 2 | Foam 3 | Foam 4 |
|---|---|---|---|---|---|---|---|
| Formulation Additive, Wt. % | | | | | | | |
| POLY G ® 30-168[1] | — | 15 | — | 5 | 10 | — | — |
| POLY-G ® 79-375[2] | — | — | 15 | — | — | 5 | 10 |
| DER-331[3] | 15 | 15 | 15 | 15 | 15 | 15 | 15 |
| DC-193[4] | 2 | 2 | 2 | 2 | 2 | 2 | 2 |
| DMP-30[5] | 5 | 5 | 5 | 5 | 5 | 5 | 5 |
| R-11B[6] | 11 | 11 | 11 | 11 | 11 | 11 | 11 |
| PAPI-135[7] | 67 | 52 | 52 | 62 | 57 | 52 | 67 |
| Processing Data | | | | | | | |
| NCO Index | 602 | 443 | 211 | 547 | 494 | 397 | 238 |
| Cream Time (sec.) | 14 | 15 | 11 | 15 | 15 | 14 | 13 |
| Rise Time | 62 | 64 | 42 | 63 | 64 | 55 | 44 |

LIMITED URETHANE-CONTAINING OXAZOLIDONE MODIFIED ISOCYANURATE FOAMS AND COMPARATIVE URETHANE-FREE AND HIGH URETHANE-CONTAINING FOAMS
Thermal Stability of Foams After 1 Hour and 24 Hours of Oven Exposure at Specified Temperatures

|  | Comparison Foam A | Comparison Foam B | Comparison Foam C | Foam 1 | Foam 2 | Foam 3 | Foam 4 |
|---|---|---|---|---|---|---|---|
| Foam Properties | | | | | | | |
| Overall Density lb/ft² | 3.48 | 3.52 | 3.41 | 3.50 | 3.49 | 3.49 | 3.50 |
| *190° C. Oven Exposure - "Preheat" Conditions* | | | | | | | |
| % Volume Increase after 1 Hr | 4.79 | 32.47 | 34.74 | 10.02 | 21.25 | 9.94 | 21.59 |
| % Volume Increase after 24 Hr | 4.86 | 27.81 | 44.07 | 9.62 | 19.77 | 10.04 | 22.62 |
| *190° C. Oven Exposure - "Slowheat" Conditions* | | | | | | | |
| % Volume Increase after 1 Hr | 2.72 | 22.13 | 19.35 | 4.73 | 9.86 | 4.99 | 9.36 |
| % Volume Increase after 24 Hr | 1.49 | 21.58 | 31.20 | 5.48 | 12.43 | 6.44 | 13.03 |
| % Weight Loss after 24 Hr | −3.19 | −9.04 | −3.01 | −4.38 | NR** | NR** | NR** |
| *210° C. Oven Exposure - "Preheat" Conditions* | | | | | | | |
| % Volume Increase after 1 Hr | R* | 29.30 | 59.75 | 22.38 | 37.39 | 20.78 | 44.63 |
| % Volume Increase after 24 Hr | R* | 14.53 | 59.82 | NR** | 30.81 | 18.48 | 44.37 |
| *210° C. Oven Exposure - "Slowheat" Conditions* | | | | | | | |
| % Volume Increase after 1 Hr | R* | 33.31 | 57.93 | 18.72 | 34.82 | 22.84 | 37.61 |
| % Volume Increase | R* | 15.59 | 66.86 | 14.48 | 32.37 | 18.91 | 41.84 |

TABLE I-continued after 24 Hr

[1] POLY-G ® 30-168 is a glycerol-propylene oxide based triol with an OH number of 168 and with a molecular weight of 1000. This is a product of Olin Corporation.
[2] POLY-G ® 79-375 is a methylglucoside-propylene oxide based polyol with an OH number of 375 and an average molecular weight of 560. This is a product of Olin Corporation.
[3] DER-331, a bisphenol A-based polyepoxide having an epoxide equivalent weight between 182-190, a product of Dow Chemical Company.
[4] DC-193, a silicone-based surfactant, a product of Dow Corning Corporation.
[5] DMP-30, a 2,4,6-tri(dimethylaminomethyl)phenol catalyst, a product of Rohm and Haas Company.
[6] R-11B, a trichlorofluoromethane blowing agent, a product of E. I. du Pont de Nemours and Company, Inc.
[7] PAPI-135, a polyisocyanate having a isocyanate equivalent weight of 135, a product of Dow Chemical Company.
*R = Ruptured foam
**NR = Not run The results as presented in TABLE I above demonstrate the superiority of the physical properties of Foams 1 through 4 over the physical properties of a urethane-free oxazolidone-containing isocyanurate (Comparison Foam A) and high-urethane oxazolidone-containing isocyanurate foams (Comparison Foams B and C) of the type disclosed in Frisch et al U.S. Pat. No. 3,849,349. More specifically, urethane-free Comparison Foam A ruptured when subjected to high temperature (210° C.) oven exposure. This rupture of Comparison Foam A was noted during the one hour at 210° C. oven exposure, under both "slowheat" and "preheat" testing conditions. Thus, Comparison Foam A exhibits the undesirable property of foam rupture at 210° C., although it shows good physical properties in terms of small volume increase of the foam at 190° C.

The percent volume increase due to foam expansion upon oven exposure was generally much improved for Foams 1 through 4, as compared to high-urethane Comparison Foams B and C. This is particularly shown by the percent volume increase under one hour 190° C. oven "preheat" conditions wherein Foams 1 through 4 provided between 9.94 and 21.59 percent volume increase, whereas Comparison Foams B and C provided 32.47 and 34.74 percent volume increase due to foam expansion, respectively.

In addition to the above-discussed physical property measurements for the foam, the percent weight loss was measured by Comparison Foams A through C and Foam 1 after 24 hours of 190° C. oven exposure under "slowheat" conditions. Foam 1 and Comparison Foams A and C provided comparable and acceptable weight losses, whereas Comparison Foam B provided an unacceptable weight loss of 9.04 weight percent, indicating significant foam cell rupture and freon loss in that foam and possible expansion-then-shrinkage of the overall foam.

Such expansion-then-shrinkage can be noted by comparing Comparison Foam B at 210° C. oven exposure wherein the volume increase after one hour of oven exposure is greater than after 24 hours due to this shrinkage phenomenon.

What is claimed is:

1. A composition useful for fabricating a high temperature degradation-resistant, cracking-resistant and scorching-resistant rigid urethane-containing oxazolidone-modified isocyanurate comprising:
   (a) at least one polyisocyanate having an isocyanate equivalent weight of between about 80 and about 160,
   (b) at least one polyepoxide present in an amount of between about 0.1 and about 0.6 equivalents of polyepoxide per equivalent of said polyisocyanate,
   (c) at least one polyol in an amount of between about 1 and about 10 weight percent based upon the total weight of said polyisocyanate plus said polyepoxide plus said polyol in said composition,
   (d) at least one catalyst to promote isocyanate trimerization and reaction of said polyepoxide and said polyol with said polyisocyanate, and
   (e) at least one blowing agent.

2. A composition according to claim 1 which additionally contains a surfactant.

3. A composition according to claim 1 wherein said catalyst is a tertiary amine catalyst.

4. A composition according to claim 3 wherein said tertiary amine catalyst is 2,4,6-tri(dimethylaminomethyl)phenol.

5. A composition according to claim 1 wherein the polyisocyanate is a polymethylene #polyphenyl isocyanate mixture containing from about 35 to about 85 percent by weight of methylenebis(phenyl isocyanate) the remainder of said mixture being polymethylene polyphenyl isocyanate of functionality greater than 2.0.

6. A composition according to claim 1 in which the polyepoxide is a diglycidyl ether of a non-fused polynuclear polyhydric phenol having the formula:

$$HO-\underset{R_1}{\underbrace{\bigcirc}}-A-\underset{R_1}{\underbrace{\bigcirc}}-OH$$

wherein $R_1$ represents from 0 to 4 substituents selected from the class consisting of halogen and lower-alkyl, and A is a bridging group selected from the class consisting of $$-\underset{R_3}{\overset{R_2}{\underset{|}{\overset{|}{C}}}}-, \quad -\underset{\overset{\parallel}{O}}{\overset{O}{\underset{\parallel}{S}}}-, \quad -\overset{O}{\underset{\parallel}{C}}-, \quad -O-, \quad -S-$$

and a single covalent bond, wherein $R_2$ and $R_3$ each represent a moiety selected from the class consisting of hydrogen, lower-alkyl, lower-cycloalkyl, and aryl.

7. A composition according to claim 1 in which the polyepoxide is the polyglycidyl ether of a novolac resin.

8. A composition according to claim 1 in which the polyepoxide is a compound of the formula:

$$R_8 \pm N \pm CH_2 - \overset{O}{\overset{}{\underset{H}{C}}} \overset{}{\diagdown} CH_2)_2]_n$$

wherein n is an integer of from 1 to 3 and $R_8$ is an aromatic residue of valency n.

9. A composition according to claim 1 in which the blowing agent is selected from the group consisting of water, a halogenated aliphatic hydrocarbon having a boiling point within the range of about −20° C. to about 110° C., and mixtures thereof.

10. A composition according to claim 2 wherein said surfactant is a silicone surfactant present in an amount of between about 1.0 and about 5.0 weight percent based upon the weight of the composition.

11. A composition according to claim 1 wherein said polyol is present in an amount of between about 5 and about 10 weight percent based upon the total weight of said polyisocyanate plus said polyepoxide plus said polyol in said composition.

12. A method of producing a high temperature degradation resistant, crack-resistant, rigid urethane-containing oxazolidone-modified isocyanurate foam by reacting a composition comprising at least one polyisocyanate having an isocyanate equivalent weight of between about 80 and about 160 with at least one polyepoxide, in an amount of between about 0.1 and about 0.6 equivalents of polyepoxide per equivalent of said polyisocyanate, and at least one polyol, in an amount of between about 1 and about 10 weight percent based upon the total weight of said polyisocyanate plus said polyepoxide plus said polyol in said composition, in the presence of at least one catalyst and at least one blowing agent to provide said foam.

13. The method of claim 12 wherein said composition additionally contains a surfactant.

14. The method of claim 12 wherein said catalyst is a tertiary amine catalyst.

15. The method of claim 14 wherein said tertiary amine catalyst is 2,4,6-tri(dimethylamino-methyl)-phenol.

16. The method of claim 12 wherein said polyisocyanate is a polymethylene polyphenyl isocyanate mixture containing from about 35 to about 85 percent by weight of methylenebis(phenyl isocyanate) the remainder of said mixture being polymethylene polyphenyl isocyanate of functionality greater than 2.0.

17. The method of claim 12 wherein said polyol is present in an amount of between about 5 and about 10 weight percent based upon the total weight of said polyisocyanate plus said polyepoxide plus said polyol in said compositions.

* * * * *

UNITED STATES PATENT AND TRADEMARK OFFICE
CERTIFICATE OF CORRECTION

PATENT NO. : 4,766,158
DATED : August 23, 1988
INVENTOR(S) : Fuzesi et al

It is certified that error appears in the above—identified patent and that said Letters Patent is hereby corrected as shown below:

In Column 17, at line 60 insert --foam-- after "isocyanurate" and before "comprising".

In Column 18, at line 28 delete "#" between "polymethylene and polyphenyl".

Signed and Sealed this

Seventeenth Day of September, 1991

Attest:

HARRY F. MANBECK, JR.

*Attesting Officer*      *Commissioner of Patents and Trademarks*